Jan. 3, 1950     G. M. CORMAN     2,493,110
LENS FOR FOCUSING INFRARED AND ULTRAVIOLET RAYS
Filed Sept. 28, 1945
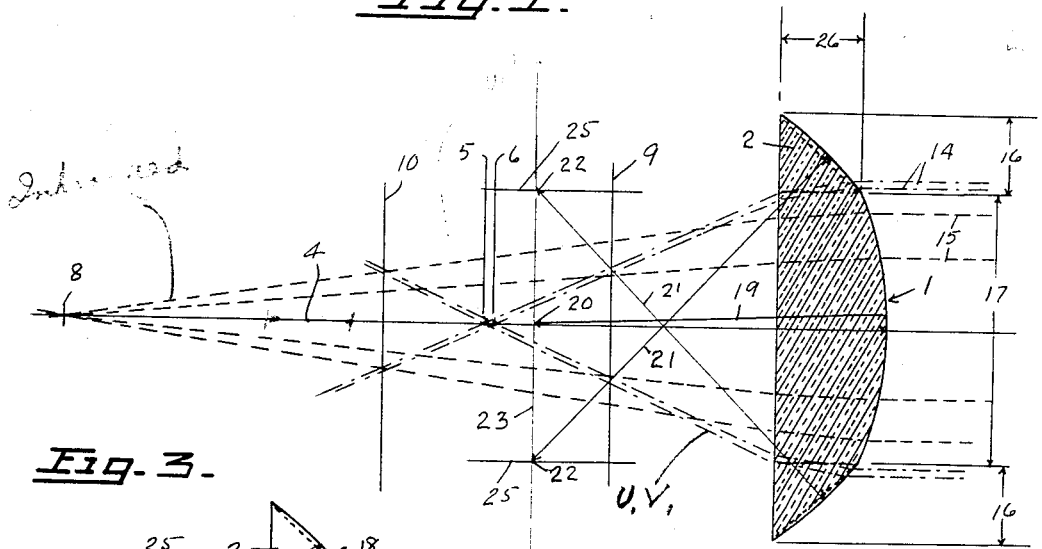
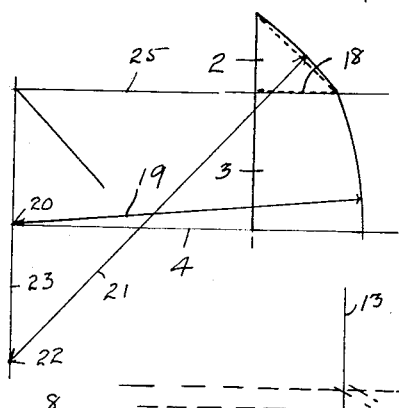
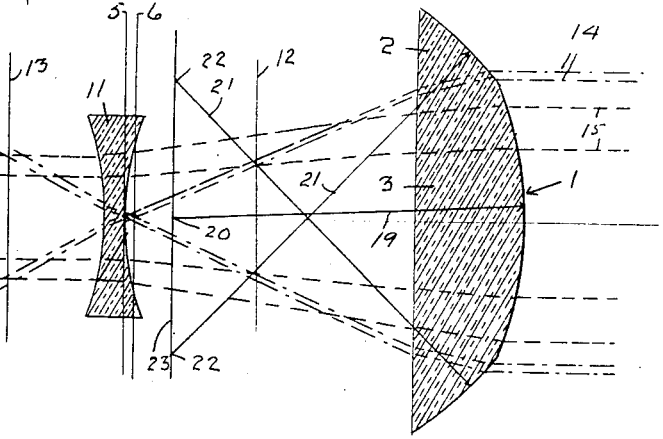
INVENTOR.
GARELD M. CORMAN
BY
Boyken, Mohler & Beckley
ATTORNEYS.

Patented Jan. 3, 1950

2,493,110

UNITED STATES PATENT OFFICE 2,493,110

LENS FOR FOCUSING INFRARED AND ULTRAVIOLET RAYS

Gareld M. Corman, Los Angeles, Calif., assignor to The Corman and Young Optical Company, Inc., Reno, Nev.

Application September 28, 1945, Serial No. 619,115

3 Claims. (Cl. 88—57)

This invention relates to a fog lens and has for one of its objects the production of a lens adapted to produce a visible image of an object from the rays reflected from the latter but which rays are invisible to the unaided eye.

Another object of the invention is the provision of a lens adapted to strengthen or intensify infra-red rays and those of somewhat similar wave lengths so as to produce a relatively clear image from the light rays reflected by an object, but which rays are invisible to the unaided eye or are so faint as to produce only a vague image.

Other objects and advantages will be seen in the description and in the drawings.

In the drawings,

Fig. 1 is a cross-sectional view through a lens embodying the invention.

Fig. 2 is a cross-sectional view through the lens of Fig. 1 and through a minus lens, illustrating one possible arrangement of the lens in an optical system, for producing magnification as in a telescope, or the like.

Fig. 3 is a diagrammatic fragmentary view illustrating more clearly certain structural features that should be observed in producing the lens.

The main lens of this invention is generally designated 1, and is of transparent material that is adapted to maintain 20 to 25% transmission of ultra-violet light in daylight, of wave lengths from 3100 to 2500 Angstrom units. This lens must be free from strain and striae and uniform molecular structure. Methyl methacrylate resin properly aged out of the influence of ultra-violet rays is a suitable material, and so far is the only material I have discovered that is adapted to fulfill the above requirements, although it is possible that there are others or that others may be developed. At this point, it is pertinent to note that a methyl methacrylate resin that cuts out the ultra-violet rays at 2900 Angstrom units is not a suitable material.

The lens 1 is circular and the lens illustrated is a plano-convex lens in which the curvature of the marginal portion 2 is different from the curvature of the central portion 3, although both are adapted to focus rays on the axis or focal line 4.

The marginal portion 2 will be termed the "outer zone" while the central portion 3 will be termed the inner zone.

The cross-sectional contour of the convex side of the outer zone 2 is such that the ultra violet rays of wave lengths from 3100 to 2500 Angstrom units will come to a focus at or between points where lines 5, 6 cross focal line 4 and the infra-red rays of approximately 10,000 Angstrom units that pass through the outer zone will come to substantially a focal point at almost the same place, but slightly farther from lens 1.

The curvature of the convex side of the inner zone is such that the infra-red rays passing therethrough come to a focus on focal line 4 at about the point where line 8 crosses said focal line, and which point is seen to be appreciably farther from the lens 1 that the focal point or points for the ultra violet rays of the wave lengths mentioned.

From the foregoing, it will be seen that there will be an impingement of the ultra-violet rays with the infra-red rays in a plane parallel with the rear face of the lens 1 at line 9 and also such impingement in a plane at line 10. A resultant image will be obtained at various points along the focal line between these planes, and in an optical system such as in a field glass, a minus lens is preferably positioned so its front face is at points 5 or 6 to provide for proper magnification of the image.

The resultant image comprises the infra-red rays made visible by the stimulation of the ultra-violet rays that are of wave lengths between 3100 and 2500 Angstrom units which have been impinged upon them in the quantity mentioned. Where the minus lens is employed its curvature is such as to substantially straighten out the infra-red rays. The ultra-violet rays will not be brought into parallelism, but will continue beyond the minus lens to form rings of light in substantially plane 13 which is relatively close to the lens. In the plane of this ring the resultant image will be produced. Also between lens 11 and 1 in plane 12 there is an impingement between the ultra violet and infra-red rays that effects the stimulation of the infra-red rays as already mentioned.

In the drawings the infra-red rays are indicated by dash lines 15, while the ultra-violet rays are indicated by dot-dash lines 14. The two focal points 5, 6 are quite close together, being spaced in actual practice about $\frac{1}{16}$ of an inch apart. This spacing is due to the thickness of the lens adjacent the juncture between the inner and outer zones, and in using lens 11 its front face is preferably positioned at either point 5 or 6. In the drawings it is shown at point 5.

The different mixtures of infra-red and ultra-violet rays will take place between points 5 or 6 and plane 13 (Fig. 2) depending upon the curvatures generated on lens 11. The ultra-violet rays between 3100 and 2500 Angstrom units that stimulate the human eye at various points between about an inch and an inch and a half from points 13 or 5 and at various points between them.

The lens illustrated is full size and in order to produce the desired result the axially projected area 16 (Fig. 1) of the outer zone around the full circumferential length thereof should be at least 60% of the entire laterally projected area of said lens, or the laterally projected area 17 of the inner zone should not be over 40% of the entire laterally projected area of the lens.

The cross-sectional contour of the outer zone is substantially coincident with the sides of a right angle isosceles triangle (Fig. 4) with the hypotenuse disposed generally along the convexly curved side and with one of the other sides 18 (Fig. 4) parallel with the axis or focal line 4 of the lens. It is pertinent to note that the angles other than the right angle are not exactly 45° but they are substantially so.

The convex curvature of the central portion is developed about a radius 19 extending from point 20 on the axis or focal line 4 of the lens, and the cross-sectional curved contour of the convex side of the outer zone is uniform at all points circumferentially thereof, and which curvature at any one side of said axis 4 is developed about a radius 21 extending from point 22 on a circle that is in a plane 23 parallel with the rear flat face of lens and which point 22 is at the opposite side of axis 4 from the side of the outer zone developed about the radii 21. Two opposite radii 21 are shown in the drawings.

The points P are seen to be on lines 25 (Figs. 1, 3) that are parallel with the focal line 4 and that extend through the juncture between the outer zone 2 and the inner zone 3. These relative proportions are important.

The radius of curvature of the outer zone is preferably from $3\frac{9}{32}$ inches to $3\frac{11}{32}$ inches taken from a point from $1\frac{1}{32}$ inches to $1\frac{3}{32}$ inches to the side of the axis or focal line 4. The preferred radius of curvature of the outer face of the inner zone is 2¾ inches and the angle of impingement between the ultra-violet rays and the infrared rays between points 5, 6 and the lens 1 is preferably as great as is practical, being from about 25° to 35° according to the convex curvatures of the inner zone 1. It is pertinent to note that in any circumstance the radius 21 must be substantially greater than three times the thickness 18 of the inner zone at the edges of the latter, which thickness is preferably about ¾ inch. In actual practice where a lens having the smaller of the two dimensions above given (where two are noted) is made, the width 16 of the outer one is preferably $\frac{1}{32}$ inch.

It is to be understood that the above figures and the detailed description are not to be considered restrictive of the invention, but merely illustrative thereof, although said figures are relatively critical.

For example, if the width and height of the outer zone were equal instead of being ¾ and $\frac{1}{32}$ inch respectively, for a 3¼ inch diameter lens, it would produce a 45° angle and there would be very little dispersion and very little separation of the ultra-violet from the other wave lengths between 3100 and 2500 Angstrom units, and between 4000 and 2000 Angstrom units. By the arrangement shown and described, the dispersion and separation are increased. The ratio between dimensions is constant for different sized lens.

The resultant image in the planes between lines 9, 10 (Fig. 1) and between lines 5, 13 (Fig. 2) are of various sizes, but are in focus along the focal line. The reason for this is that an impinged image brought out parallel is always in focus and only needs definition by diaphragming down along the focal line. The importance of this feature in the taking of motion pictures is apparent, since the camera need not be moved in order to enlarge or diminish the image on the film. A relatively slight movement of the relation between lens 11, 1 will do this.

The rings of light that form in plane 13 or in planes beyond those in which the ultra-violet rays are in focus, are rings of the various spectrum colors, beginning at red at the outer zone and extending through the spectrum to the ultra violet. No rings are formed in the planes in which the ultra-violet rays are in focus.

It should be added that between a plane at line 5 and a plane at line 23 the image to be viewed would be diffused on a screen disposed between such planes.

In making the statement that the lens 1 is adapted to maintain 20 to 25% transmission of ultra-violet light in daylight, of wave lengths from 3100 to 2500 Angstrom units, it is not intended that no others are used or that the lens is only usable in daylight. The statement so made merely defines a standard that appears to be most effective. Actually, ultra-violet rays between 4000 and 2000 Angstrom units are used and the lens passes ultra-violet rays in the atmosphere at night.

Furthermore, while the greatest amount of impingement between ultra-violet rays and infrared rays occurs between lines 9, 10, there is an effective impingement commencing within the lens 1 itself and at points outwardly thereof.

The fact that the majority of the ultra-violet rays are brought to a focus along lines 5, 6 does not make it essential to position the lens 11 exactly as shown. The minus lens 11 may be positioned so its face that is adjacent lens 1 is in a plane indicated by line 23 where ultra-violet rays are also brought to a focus. When the minus lens is positioned in a plane at line 23 the resultant image will not begin to form until line 5 or a little beyond line 5 in direction toward line 10 (Fig. 1).

I claim:

1. A plano-convex lens formed with an annular marginal portion having a uniform cross-sectional contour substantially coincident with the sides of a right angle isosceles triangle with the hypotenuse disposed along the convexly curved side and with one of the other sides parallel with the axis of the lens and defining the juncture between the central portion of the lens enclosed by said marginal portion, the convex curvature of said central portion being developed about a radius extending from a point on the central axis of said lens, the cross-sectional curved contour of the convex side of said marginal portion being uniform at all points circumferentially thereof and the said curvature at any one side of said axis being developed about a radius extending from a point on a circle that is in a plane parallel with the flat side of said lens and extending through the said point on said axis and which point on such circle is at the opposite side of the axis of said one side of the said marginal portion, said lens being of a transparent material adapted to transmit ultra-violet rays of wave lengths from 3100 to 2500 Angstrom units and the axially projected area of said marginal portion being at least 60% of the total axially projected area of said lens.

2. A converging lens for producing an ocularly viewable image of an object substantially obscured by fog, said lens having a central zone and a marginal zone radially outwardly thereof both concentric with the principal axis of said lens, said outer zone having its refractive surface uniformly curved in all planes extending radially from said axis and the central zone having a spherical refractive surface different from that of said outer zone with its radius about a point on said principal axis, the said outer and inner zones respectively having spaced focal points on said principal axis for ultra violet rays of a length between 3100 and 2500 Angstrom units and infra red rays with the said focal point of said outer zone for said ultra violet rays being between said lens and the focal point of said inner zone for said infra red rays whereby the ultra violet rays will cross said infra red rays between said lens and the focal point of said outer zone, the material of said lens being transparent and being adapted to pass substantially 25% of the ultra violet rays in daylight having wave-lengths between 3100 and 2500 Angstrom units, the said inner and outer zones having their curved refractive surfaces in adjoining relationship and the degree of curvature of the said curved refractive surface of said outer zone in any of said planes being less than the degree of curvature of the said curved refractive surface of said inner zone.

3. A converging lens for producing an ocularly viewable image of an object substantially obscured by fog, said lens having a central zone and a marginal zone radially outwardly thereof both concentric with the principal axis of said lens, said outer zone having its refractive surface uniformly curved in all planes extending radially from said axis and the control zone having a spherical refractive surface different from that of said outer zone with its radius about a point on said principal axis, the said outer and inner zones respectively having spaced focal points on said principal axis for ultra violet rays of a length between 3100 and 2500 Angstrom units and infra red rays with the said focal point of said outer zone for said ultra violet rays being between said lens and the focal point of said inner zone for said infra red rays whereby the ultra violet rays will cross said infra red rays between said lens and the focal point of said outer zone, the material of said lens being transparent and being adapted to pass substantially 25% of the ultra violet rays in daylight having wave-lengths between 3100 and 2500 Angstrom units, said inner and outer zones having their curved refractive surfaces in adjoining relationship with the axially projected area of said outer zone being at least 60% of the total axially projected area of said lens, the spacing of said focal points being such that the said refracted ultra violet rays will cross said ultra violet rays at an angle of between 20° to 30°.

GARELD M. CORMAN.

REFERENCES CITED

The following references are of record in the file of this patent:

UNITED STATES PATENTS

| Number | Name | Date |
| --- | --- | --- |
| 2,085,437 | Michelssen | June 29, 1937 |
| 2,086,286 | Stanley | July 6, 1937 |
| 2,216,965 | Sukumlyn | Oct. 8, 1940 |
| 2,233,591 | Dulovitis | Mar. 4, 1941 |
| 2,272,827 | Barnes | Feb. 10, 1942 |

FOREIGN PATENTS

| Number | Country | Date |
| --- | --- | --- |
| 11,140 | France (Addition to No. 394,514). | Oct. 26, 1909 |
| 335,696 | Great Britain | Oct. 2, 1930 |
| 723,996 | France | Jan. 23, 1932 |